United States Patent [19]

Lanier

[11] 3,938,961

[45] Feb. 17, 1976

[54] SAMPLE TRAY

[75] Inventor: Terry O. Lanier, Northboro, Mass.

[73] Assignee: Corning Glass Works, Corning, N.Y.

[22] Filed: Mar. 24, 1975

[21] Appl. No.: 561,265

[52] U.S. Cl. ................ 23/292; 23/259; 73/425.4 R; 195/127

[51] Int. Cl.[2] ..................... G01N 1/14; G01N 31/20

[58] Field of Search .................. 23/253 R, 259, 292; 195/127; 73/425.4 R

[56] References Cited

UNITED STATES PATENTS

| | | | |
|---|---|---|---|
| 3,526,480 | 9/1970 | Findl et al. | 23/292 X |
| 3,556,731 | 1/1971 | Martin | 23/253 R |
| 3,692,498 | 9/1972 | Frank et al. | 23/253 X |
| 3,713,985 | 1/1973 | Astle et al. | 195/127 X |

*Primary Examiner*—R. E. Serwin
*Attorney, Agent, or Firm*—Walter S. Zebrowski; Clarence R. Patty, Jr.

[57] ABSTRACT

A sample tray for containing one or more fluid samples is provided. Each sample is maintained in a separate elevated reservoir affixed to a base plate and each elevated reservoir is surrounded by a catch basin. A wall surrounds each catch basin so that the catch basins are distinct. The tray may have means for alignment of the test specimen reservoirs in cooperation with a utilization device.

5 Claims, 3 Drawing Figures

SAMPLE TRAY

BACKGROUND OF THE INVENTION

1. Field of the Invention

The present invention relates to a sample tray, but in particular to a device for storing fluid test specimens suitable for filling fluid dispensers.

2. Description of the Prior Art

Multiple fluid dispensers have heretofore been filled in various ways such as, for example, filling each of a plurality of dispensers by hand, dipping individual dispensers in a pool of fluid, and the like. Numerous problems exist with such prior art methods including physical difficulty of filling individual fluid dispensers, the time-consuming nature of such filling, high probability of contaminating adjoining dispensers, and the like. Furthermore, prior art methods and devices in general have not been conducive to high speed, reliable laboratory testing.

SUMMARY OF THE INVENTION

The objects of this invention are to provide a sample tray which is economical, provides a fast easy way of filling multiple fluid dispensers, impedes contamination between various test specimens, and overcomes the heretofore noted disadvantages.

Broadly, according to the present invention, a sample tray is provided having a base plate and at least one elevated test specimen reservoir affixed to one surface of the base plate intermediate the ends thereof. A catch basin surrounds each of the elevated specimen reservoirs and a wall surrounds each catch basin so that each catch basin is distinct. A means for alignment of the test specimen reservoirs in cooperation with a utilization device is also provided.

Additional objects, features, and advantages of the present invention will become apparent to those skilled in the art from the following detailed description and the attached drawings on which, by way of example, only the preferred embodiment of this invention is illustrated.

DETAILED DESCRIPTION

It is to be noted that the drawings are illustrative and symbolic of the invention, and there is no intention to indicate scale or relative proportion of the elements shown therein.

Figure 1:
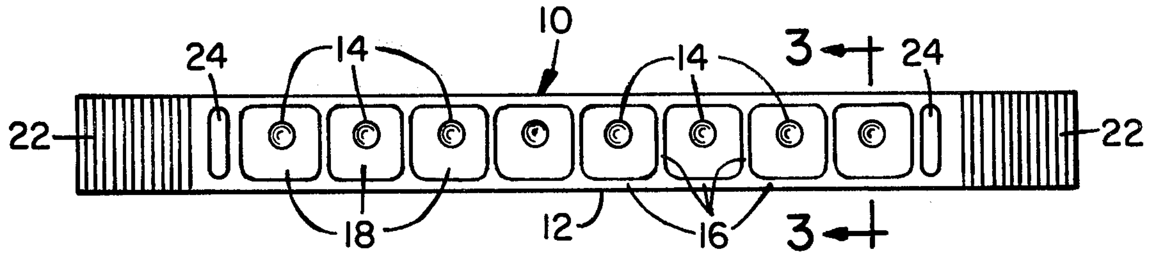
FIG. 1 is a plan view of the sample tray of the present invention.
Figure 2:
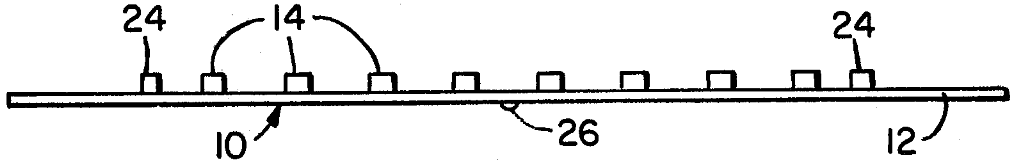
FIG. 2 is a side elevation of the sample tray of the present invention.

Referring to FIGS. 1 and 2, there is shown a sample tray 10 which includes a base plate 12 and a plurality of test specimen reservoirs 14. Test specimen reservoirs 14 are affixed to one surface of base plate 12 and are elevated thereabove. Defining walls 16 surround each test specimen reservoir and are spaced therefrom to define catch basins 18 surrounding each of said elevated test specimen reservoirs. Walls 16 surround each catch basin 18 so that each such basin is separated from all other catch basins.

Figure 3:
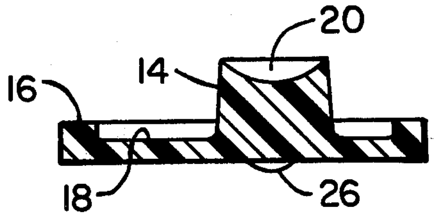
FIG. 3 is a cross-sectional elevation taken along lines 3—3 of FIG. 1.

Referring additionally to FIG. 3, elevated test specimen reservoir 14 is shown in greater detail wherein fluid receiving compartment 20 of the reservoir is shown as the recess portion at the top of each reservoir. As will be understood, to facilitate high volume specimen testing, reservoirs 14 are substantially disposed in a straight line.

The sample tray of the present invention has particular utility with a utilization device such as the "Fluid Dispensing Device" described in U.S. patent application Ser. No. 561,267 by T. O. Lanier and E. F. Martha filed concurrently herewith, which application is expressly incorporated herein by reference. To facilitate insertion and removal of sample tray 10 from such a device, base plate 12 is provided with knurls 22 at each end thereof and finger supports 24 adjacent knurls 22. As will be understood, knurls 22 and finger supports 24 are shown for ease of using the present sample tray and do not form a part of the present invention.

In utilizing sample tray 10 of the present invention in conjunction with any utilization device, such for example as the "Fluid Dispensing Device" of U.S. patent application Serial No. 561,267, it is necessary to provide accurate alignment of the sample tray within such device. One such means for alignment is protrusion 26 which permits sample tray 10 to be caused to slide into place until protrusion 26 engages a corresponding depression in the utilization device.

Fluid test specimens may be disposed within the elevated test specimen reservoir receiving compartments by any means known in the art such for example as an eye dropper. The test specimen fluid may then be withdrawn from the reservoir by, for example, such means as a disposable "Applicator Card" described in U.S. patent application Ser. No. 561,266 filed concurrently herewith by T. O. Lanier and E. F. Martha, which application is expressly incorporated herein by reference.

As a typical example, the sample tray of the present invention may be formed of styrene plastic material, although it will be understood that any material compatible with the test specimen fluid to be used is suitable. The fluid receiving compartment at the top of the test specimen reservoir may be of any shape such as a spherical segment. A typical volume of such a compartment may be 10 microliters.

As will be understood, it is important to have isolated catch basins surrounding each test specimen reservoir so as to prevent comingling of test specimen fluids that may spill over the edge of the fluid receiving compartment either during filling or while the specimen fluid is being withdrawn therefrom.

Although the present invention has been described with respect to details of certain embodiments thereof, it is not intended that such details be limitations upon the scope of the invention except insofar as set forth in the following claims.

I claim:

1. A sample tray comprising a base plate, at least one elevated test specimen reservoir affixed to one surface of said base plate intermediate the ends thereof, a catch basin surrounding each elevated test specimen reservoir, and a wall surrounding each said catch basin so that each said catch basin is separated from each other catch basin.

2. The sample tray of claim 1 having a plurality of said elevated test specimen reservoirs.

3. The test sample tray of claim 2 wherein said plurality of elevated test specimen reservoirs are disposed in substantially a straight line.

4. The test sample tray of claim 1 further comprising means for alignment of said test specimen reservoirs in cooperation with a utilization device.

5. The test sample tray of claim 4 wherein said means for alignment is a protrusion disposed on the surface of said base plate opposite said one surface.

* * * * *